US008732802B2

(12) United States Patent
Lessin et al.

(10) Patent No.: US 8,732,802 B2
(45) Date of Patent: May 20, 2014

(54) RECEIVING INFORMATION ABOUT A USER FROM A THIRD PARTY APPLICATION BASED ON ACTION TYPES

(75) Inventors: Samuel Lessin, Palo Alto, CA (US); Robert Taaffe Lindsay, San Francisco, CA (US); Justin Alexander Shaffer, Menlo Park, CA (US); Nicholas Felton, Brooklyn, NY (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 13/567,052

(22) Filed: Aug. 4, 2012

(65) Prior Publication Data

US 2014/0041038 A1 Feb. 6, 2014

(51) Int. Cl.
*G06F 17/30* (2006.01)
*G06F 15/16* (2006.01)

(52) U.S. Cl.
USPC ............................. 726/4; 709/205

(58) Field of Classification Search
USPC .................... 726/4; 709/205, 204
See application file for complete search history.

(56) References Cited

U.S. PATENT DOCUMENTS

| 2009/0144392 | A1 | 6/2009 | Wang et al. |
| 2010/0132049 | A1 * | 5/2010 | Vernal et al. ................. 726/27 |
| 2010/0306834 | A1 | 12/2010 | Grandison et al. |
| 2011/0137932 | A1 * | 6/2011 | Wable .......................... 707/769 |
| 2012/0101898 | A1 | 4/2012 | Kendall et al. |
| 2012/0179958 | A1 | 7/2012 | Tarjan |

FOREIGN PATENT DOCUMENTS

| KR | 10-2012-0028885 A | 3/2012 |
| WO | WO 2010/128198 A1 | 11/2010 |

OTHER PUBLICATIONS

U.S. Appl. No. 13/239,340, filed Sep. 21, 2011 (copy not enclosed).
PCT International Search Report and Written Opinion, PCT Application No. PCT/US2013/051693, Nov. 26, 2013, eleven pages.

* cited by examiner

*Primary Examiner* — Jeffrey Pwu
*Assistant Examiner* — Samuel Ambaye
(74) *Attorney, Agent, or Firm* — Fenwick & West LLP

(57) ABSTRACT

A social networking system enables a third party application to request user data based on action types and aggregations of a user's data corresponding to an action type with respect to multiple objects. Users of the social networking system may provide privacy or accessibility of their information based on the action type associated with the information (e.g., a user may allow a particular application to access all actions of a certain type, regardless of the source of those actions). The third party application may use this accessed information to generate personalized content for a user based on aggregations of the user's data and then publish the personalized content back to the social networking system.

12 Claims, 7 Drawing Sheets

RECEIVING INFORMATION ABOUT A USER FROM A THIRD PARTY APPLICATION BASED ON ACTION TYPES

BACKGROUND

This disclosure relates generally to social networking, and in particular to providing and receiving information about a user to a third party applications based on action types associate with the information.

Social networking systems have become prevalent in recent years because they provide a useful environment in which users can connect to and communicate with other users. Although a variety of different types of social networking systems exist, these systems commonly provide mechanisms allowing users to define and interact within their social networks. In this context, a user may be an individual or any other entity, such as a business or other non-person entity. Accordingly, while enabling social communications among friends, a social networking system can also be a valuable tool for businesses to engage with potential consumers. Even without a commercial purpose, a social networking system may allow other types of entities to spread their message. For example, a non-person entity may set up a page or group that other users can "like" or otherwise become associated with, which enables the non-person entity to provide a forum to receive and transmit communications to a group of interested users.

Useful social information may be maintained conceptually in a "social graph" of nodes interconnected by edges. Each node in the social graph represents something that can act on and/or be acted upon by another node. Common examples of nodes include users, non-person entities, content items, groups, events, locations, messages, concepts, and any other things that can be represented by an object in a social networking system. An edge between two nodes in the social graph represents a particular kind of connection between the two nodes resulting from an action that was performed by one of the nodes on the other node.

For example, if one user establishes a connection with another user in the social networking system, the users are represented as nodes, and the edge between them represents the established connection. Continuing this example, one user may send a message to the other within the social networking system. The messaging action represents another edge between the two nodes that is identified by the social networking system. The message itself may be treated as a node. In another example, one user may tag another user in an image maintained by the social networking system. This tagging action may create edges between the users as well as an edge between each of the users and the image, also a node. In yet another example, if a user confirms attendance at an event, the user and the event are nodes, where the attendance of the event is the edge. Using a social graph, therefore, a social networking system may maintain many different types of objects and the interactions and connections among those objects, thereby generating an extremely rich store of socially relevant information.

Social networking systems allow users to share their interests and preferences in real-world concepts, such as their favorite movies, musicians, celebrities, soft drinks, hobbies, sports teams, and activities. These interests may be declared by users in user profiles and may also be inferred by social networking systems. Users can also interact with these real-world concepts through multiple communication channels on social networking systems, including interacting with pages on the social networking system, sharing interesting articles about causes and issues with other users on the social networking system, and commenting on actions generated by other users on objects external to the social networking system. Actions performed on objects by users on external websites, such as playing gaming applications, listening to music-streaming services, and reading document sharing systems, may also be captured by the social networking system. Although users may share their interests, tools have not been developed to enable users share information about their interactions with objects to third party applications.

Accordingly, what are needed are mechanisms to enable users to share information with third party applications based on action types. This enables third party applications to generate content personalized to the user.

SUMMARY

In a social networking system, users may perform various types of actions with respect to objects (e.g., for a song, a user can buy, listen to, recommend, or like the song). Objects on the social networking system may include object properties (e.g., for a song, an artist, genre, and album are the song's object properties). Each type of action that is performed on a type of object may be aggregated in a different way (e.g., listened to a song 5 times, or ran an average of 10 miles per week). Actions may be performed on objects by users directly while using the social networking system. However, actions may also be performed for the user using a third-party application installed on the social networking system platform as well as on applications and systems external to the social networking system. Embodiments of the disclosure enable a third party application to request user data based on action types and aggregations of a user's data corresponding to an action type with respect to multiple objects. Users of the social networking system may provide privacy or accessibility of their information based on the action type associated with the information (e.g., a user may allow a particular application to access all actions of a certain type, regardless of the source of those actions). The third party application may use this accessed information to generate personalized content for a user based on aggregations of the user's data and then publish the personalized content back to the social networking system.

Figure 1:
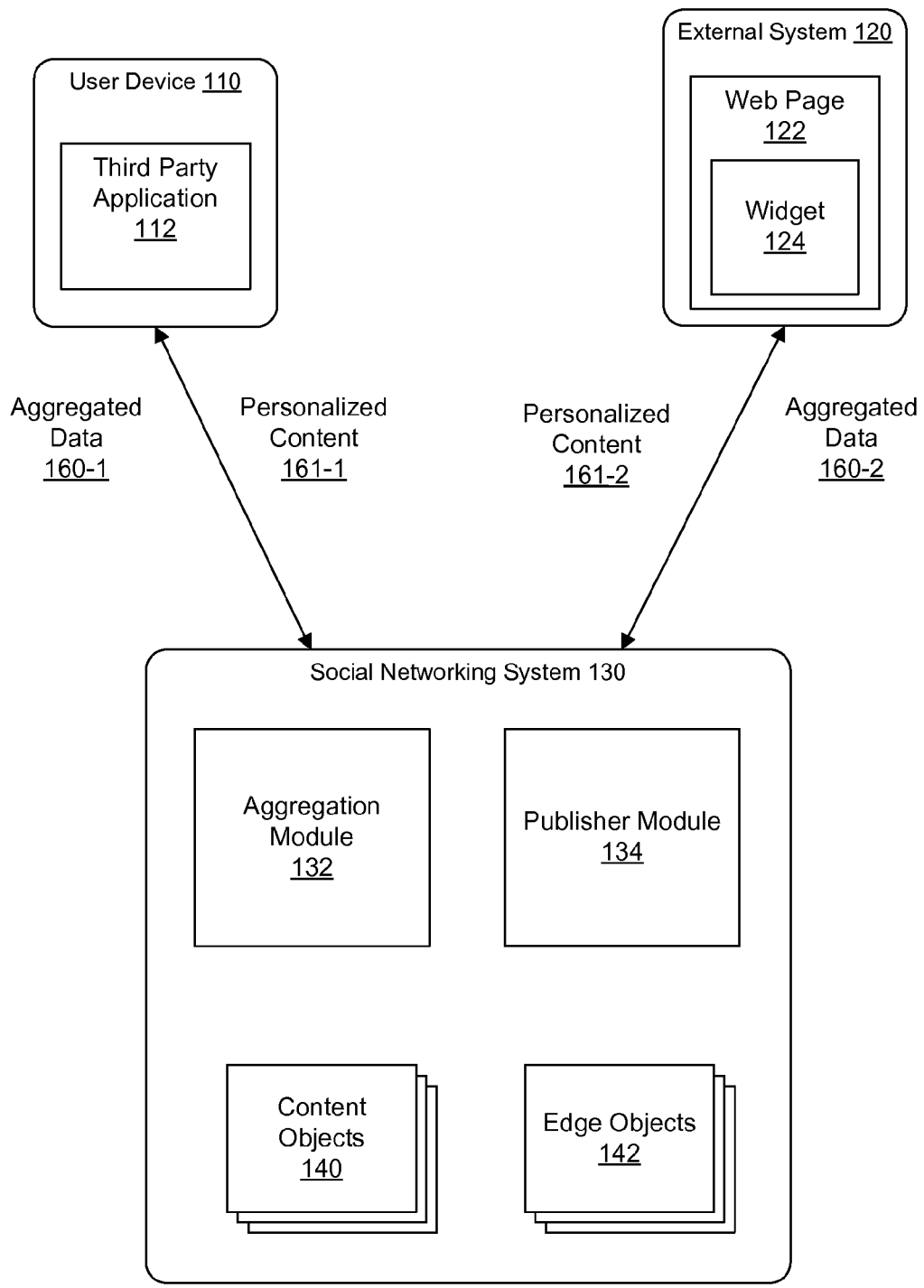
FIG. 1 is a high level block diagram of a process for providing third party applications with data that is aggregated based on action type, in accordance with some embodiments.

The figures depict various embodiments of the present disclosure for purposes of illustration only. One skilled in the art will readily recognize from the following discussion that alternative embodiments of the structures and methods illustrated herein may be employed without departing from the principles of the disclosure described herein.

DETAILED DESCRIPTION

Overview

A social networking system offers its users the ability to communicate and interact with other users of the social networking system. Users join the social networking system and add connections to a number of other users to whom they desire to be connected. Users of social networking system can provide information describing them which is stored as user profiles. For example, users can provide their age, gender, geographical location, education history, employment history and the like. The information provided by users may be used by the social networking system to direct information to the user. For example, the social networking system may recommend social groups, events, and potential friends to a user. A social networking system may also enable users to explicitly express interest in a concept, such as celebrities, hobbies, sports teams, books, music, and the like. These interests may be used in a myriad of ways, including targeting advertisements and personalizing the user experience on the social networking system by showing relevant stories about other users of the social networking system based on shared interests.

A social graph includes nodes connected by edges that are stored on a social networking system. Nodes include users and objects of the social networking system, such as web pages embodying concepts and entities, and edges connect the nodes. Edges represent a particular interaction between two nodes, such as when a user expresses an interest in a news article shared by another user about "America's Cup." The social graph may record interactions between users of the social networking system as well as interactions between users and objects of the social networking system by storing information in the nodes and edges that represent these interactions. Custom graph object types and graph action types may be defined by third-party developers as well as administrators of the social networking system to define attributes of the graph objects and graph actions. For example, a graph object for a movie may have several defined object properties, such as a title, actors, directors, producers, year, and the like. A graph action type, such as "purchase," may be used by a third-party developer on a website external to the social networking system to report custom actions performed by users of the social networking system. In this way, the social graph may be "open," enabling third-party developers to create and use the custom graph objects and actions on external websites.

Third-party developers may enable users of the social networking system to express interest in web pages hosted on websites external to the social networking system. These web pages may be represented as page objects in the social networking system as a result of embedding a widget, a social plug-in, programmable logic or code snippet into the web pages, such as an iframe. Any concept that can be embodied in a web page may become a node in the social graph on the social networking system in this manner. As a result, users may interact with many objects external to the social networking system that are relevant to a keyword or keyword phrase, such as "Justin Bieber." Each of the interactions with an object may be recorded by the social networking system as an edge. Enabling third-party developers to define custom object types and custom action types is described further in "Structured Objects and Actions on a Social Networking System," U.S. application Ser. No. 13/239,340 filed on Sep. 21, 2011, which is hereby incorporated by reference.

A social networking system may enable a user to grant third party applications access to aggregations of user data based on action type. A sophisticated third party application may aggregate this data in order to provide the user with personalized content. For example, a third party application may retrieve aggregations of user data based on the action type "purchase." Using this data, the third party application may generate an analysis of the user's purchasing activities.

In another embodiment, a social networking system may aggregate user data based on object types or properties. A third party application may specify one or more object types and/or one or more object features in a request for user data. For example, a third party application may access data about a user listening to songs from a particular artist because song objects have an associated artist object as an object property. Similarly, a third party application may access data about a user based on a threshold number of plays of any song within a certain genre, such as Pop music, because song objects are associated with genre objects. A social networking system may also enable third party application to specify aggregations on multiple different types of actions, such as a predetermined number of plays of a song and at least one previous check-in at a concert hall. In short, objects in the social networking system have metadata associated with the objects that vary based on the type of object. A social networking system may enable third party applications to retrieve aggregations of these object properties, or features of objects.

FIG. 1 illustrates a high level block diagram of a process of providing third party applications with data that is aggregated based on action type, in one embodiment. The aggregation module 132 of the social networking system 130 responds to requests for information about a user with respect to a type of action. The requests may include a user identifier for the user and may specify one or more action types. The aggregation module 132 responds to the request with aggregated user data 160 that is aggregated based on the one or more action types specified in the request. For example, the aggregated user data 160 may be aggregated based on the action types of "run," "swim," and "bike." The aggregated user data 160 includes information from content objects 138 and edge objects 138 that are associated with the specified action types. For example, the aggregated data may be from edge objects having the action type of "run," "swim," and "bike." A content object 136 on the social networking system 130 may be acted upon by a user of the social networking system 130. A content object 136 may include any type of object on the social networking system 130, such as a page post, a status update, a newsfeed story, a photo, a video, a link, a shared content item, a gaming application achievement, a check-in event at a local business, and so on. The interaction between the user and the content object 130 generates an edge object 138 that includes information about the interaction, including identifying information about the user, the content object 136, and the type of action that was performed. In one embodiment, the content object 136 on the social networking system 130 may be acted upon by a user of the social networking system 130 through a specific application installed on the social networking system 130.

In some embodiments, the aggregation module 132 responds to requests that specify object types and/or features. The aggregation module 132 responds with aggregated user data that is aggregated based on the specified objects types and/or features. For example, the aggregation module 132 may respond with information about a user's check-ins, posted images, comments, likes, and posted links.

In some embodiments, the publisher module 134 of the social networking system 130 may receive personalized content 161 to publish to the social networking system. The personalized content is generated based on the aggregated user data 160. In some embodiments, the publisher module 134 receives news stories about the aggregated user data 160. For example, a third party application 112 may send the publisher module 134 a news story containing a chart showing about the user's running, swimming, and biking activities. In some embodiments, the publisher module 134 receives composer interface input. The composer interface input may include text, videos, or images relating to the aggregated user data 160. For example, the composer interface may include a status message update that includes statistics about the user's recent running, swimming, and biking activities. The personalized content may be published to one or more pages of the social networking system such as a newsfeed, a profile page, or an application specific page.

Individual actions, edges and/or objects included in the aggregated user data 160 may be individually accessed, allowing the aggregated user data 160 as well as its individual aggregations of objects or actions allow access to the aggregation as well as the various objects and/or actions included in the aggregation. For example, aggregated user data 160 based on the action types of "run," "swim," and "sleep," includes information from content objects 136 and edge objects 138 associated with the specified action types of "fun," "swim," and "sleep." A third party application 112, which may be included in the user device 110, may access the content objects 136 and/or edge objects 138 in the aggregated user data 160 to generate personalized content for the user, as described below. The user may associate different permissions with the content object 136 and/or edge objects 138 in the aggregated user data 160 to regulate third party application access to objects within the aggregated user data 160. For example, a user may allow a fitness training third party application 112 to access content objects 136 and/or edge objects 138 associated with "run" and "swim" action types while preventing the fitness training third party application 112 from accessing content objects 136 or edge objects 128 associated with a "sleep" action type.

The user device 110 includes a third party application 112 that generates personalized content for the user based on aggregated user data 160 from the social networking system 130. As discussed above, the aggregated user data 160 may be aggregated based on action types, object types, object properties, or any combination thereof. For example, the third party application 112 may send a request to the social networking system 130 requesting data aggregated based on the action type of "run." Responsive to the request, the third party application 112 may receive data from one or more objects maintained by the social networking system 130 associated to the edge object having the action type of "run." The third party application 112 may use the aggregated user data 160 to generate personalized content for the user, as discussed above.

The external system 120 includes a webpage 122 with a widget 124 that includes instructions for communicating with the social networking system 130 and/or the user device 110. The widget 124 may obtain aggregated user data that is aggregated based on action types, object types, object properties, or any combination thereof. The widget 124 may use this data to generate personalized content to display to the user.

Using the above methods, a social networking system may enable third party applications 112 and third party websites to retrieve data that is aggregated based on interactions captured by the social networking system. These interactions may occur within the social networking system, such as interactions with other users of the social networking system via messages, wall posts, and comments, application interactions, and other interactions with objects on the social networking system, such as uploading videos and photos and interacting with gaming applications on the social networking system. User interactions may also be performed external to the social networking system, such as completing a running workout, finishing a road trip across the country, and playing songs on a playlist.

FIG. 1 and the other figures use like reference numerals to identify like elements. A letter after a reference numeral, such as "160-1," indicates that the text refers specifically to the element having that particular reference numeral. A reference numeral in the text without a following letter, such as "160," refers to any or all of the elements in the figures bearing that reference numeral (e.g., "160" in the text refers to reference numerals "160-1" and/or "160-2" in the figures).

System Architecture

Figure 2:
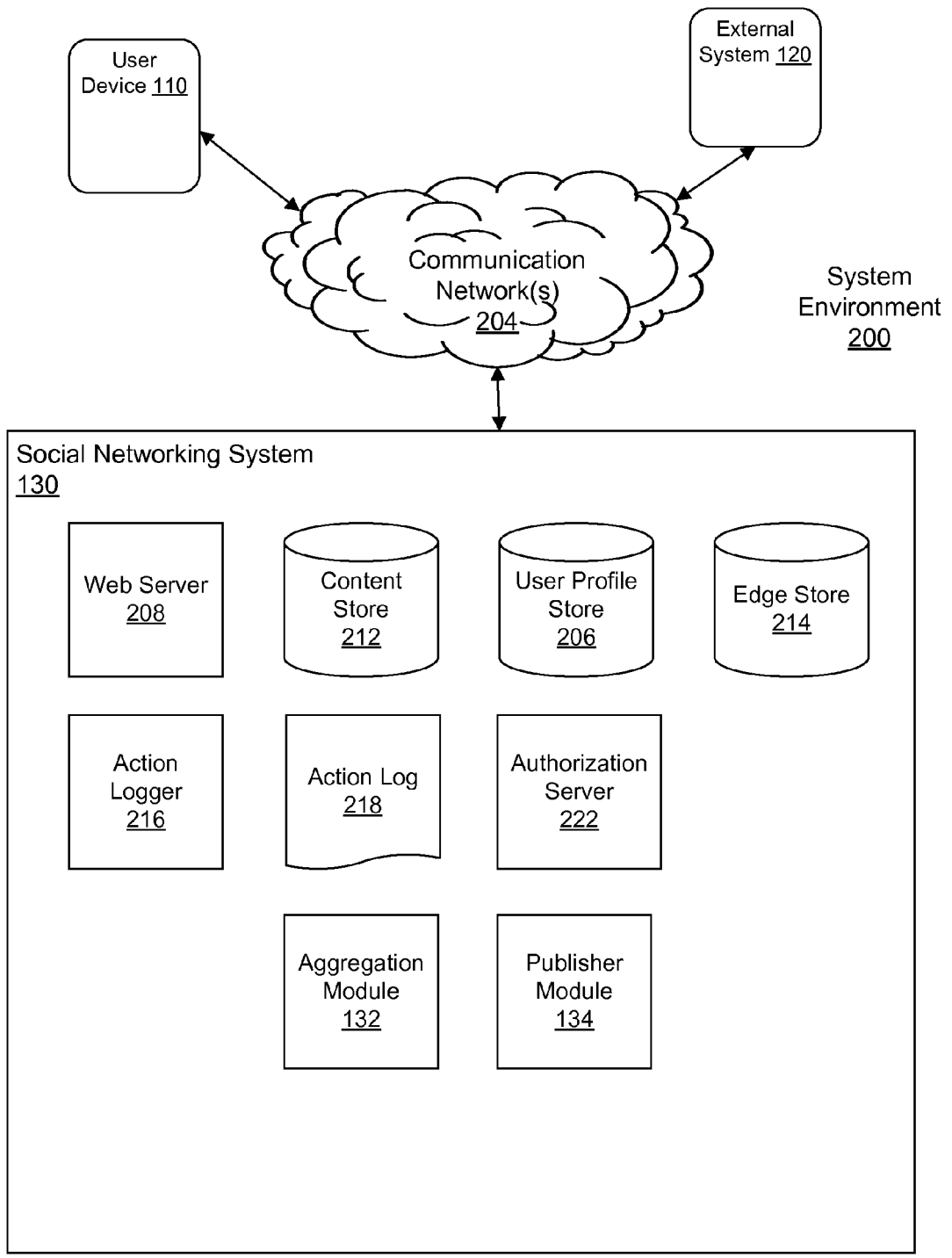
FIG. 2 is a high level block diagram of illustrating a system environment, in accordance with some embodiments.

FIG. 2 is a high level block diagram illustrating a system environment 200 suitable for enabling a third party application to access a user's data that is aggregated based on the user's interactions, in accordance with an embodiment of the disclosure. The system environment comprises one or more user devices 110, the social networking system 130, a network 204, and one or more external systems 120. In alternative configurations, different and/or additional modules can be included in the system. For purposes of illustration, the embodiment of the system environment 200 shown by FIG. 2 includes a single external system 120 and a single user device 110. However, in other embodiments, the system environment 200 may include more user devices 110 and/or more external systems 120.

The user devices 110 comprise one or more computing devices that can receive user input and can transmit and receive data via the network 204. In one embodiment, the user device 110 is a conventional computer system executing, for example, a Microsoft Windows-compatible operating system (OS), Apple OS X, and/or a Linux distribution. In another embodiment, the user device 110 can be a device having computer functionality, such as a personal digital assistant (PDA), mobile telephone, smart-phone, etc. The user device 110 is configured to communicate via network 204. The user device 110 can execute an application, for example, a browser application that allows a user of the user device 110 to interact with the social networking system 130. In another embodiment, the user device 110 interacts with the social networking system 130 through an application programming interface (API) that runs on the native operating system of the user device 110, such as iOS 4 and ANDROID.

In one embodiment, the network 204 uses standard communications technologies and/or protocols. Thus, the network 204 can include links using technologies such as Ethernet, 802.11, worldwide interoperability for microwave access (WiMAX), 3G, 4G, CDMA, digital subscriber line (DSL), etc. Similarly, the networking protocols used on the network 204 can include multiprotocol label switching (MPLS), the transmission control protocol/Internet protocol (TCP/IP), the User Datagram Protocol (UDP), the hypertext transport protocol (HTTP), the simple mail transfer protocol (SMTP), and the file transfer protocol (FTP). The data exchanged over the network 204 can be represented using technologies and/or formats including the hypertext markup language (HTML) and the extensible markup language (XML). In addition, all or some of links can be encrypted using conventional encryption technologies such as secure sockets layer (SSL), transport layer security (TLS), and Internet Protocol security (IPsec).

FIG. 2 contains a block diagram of the social networking system 130. The social networking system 130 includes a web server 208, a user profile store 206, a content store 212, an edge store 214, an action logger 216, an activity log 218, authorization server 222, aggregation module 132, and publisher module 134. In other embodiments, the social networking system 130 may include additional, fewer, or different modules for various applications. Conventional components such as network interfaces, security functions, load balancers, failover servers, management and network operations consoles, and the like are not shown so as to not obscure the details of the system.

The web server 208 links the social networking system 130 via the network 204 to one or more user devices 110; the web server 208 serves web pages, as well as other web-related content, such as Java, Flash, XML, and so forth. The web server 208 may provide the functionality of receiving and routing messages between the social networking system 130 and the user devices 110, for example, instant messages, queued messages (e.g., email), text and SMS (short message service) messages, or messages sent using any other suitable messaging technique. The user can send a request to the web server 208 to upload information, for example, images or videos that are stored in the content store 212. Additionally, the web server 208 may provide API functionality to send data directly to native user device operating systems, such as iOS, ANDROID, webOS, and RIM.

The action logger 216 is capable of receiving communications from the web server 208 about user actions on and/or off the social networking system 130. The action logger 216 populates an action log with information about user actions to track them. Such actions may include, for example, adding a connection to the other user, sending a message to the other user, uploading an image, reading a message from the other user, viewing content associated with the other user, attending an event posted by another user, among others. In addition, a number of actions described in connection with other objects are directed at particular users, so these actions are associated with those users as well.

An action log 218 may be used by a social networking system 130 to track users' actions on the social networking system 130 as well as external websites that communication information back to the social networking system 130. As mentioned above, users may interact with various objects on the social networking system 130, including commenting on posts, sharing links, and checking-in to physical locations via a mobile device. The action log 218 may also include user actions on external websites. For example, an e-commerce website that primarily sells luxury shoes at bargain prices may recognize a user of a social networking system 130 through social plug-ins that enable the e-commerce website to identify the user of the social networking system. Because users of the social networking system 130 are uniquely identifiable, e-commerce websites, such as this luxury shoe reseller, may use the information about these users as they visit their websites. The action log records data about these users, including viewing histories, advertisements that were clicked on, purchasing activity, and buying patterns.

The user profile store 206 stores user account information and other related information for a user. The user profile information stored in user profile store 206 describes the users of the social networking system 130, including biographic, demographic, and other types of descriptive information, such as work experience, educational history, gender, hobbies or preferences, location, and the like. The user profile may also store other information provided by the user, for example, images or videos. In certain embodiments, images of users may be tagged with identification information of users of the social networking system 130 displayed in an image. The user profile store 206 also maintains references to the actions stored in an action log and performed on objects in the content store 212.

The edge store 214 stores the information describing connections between users and other objects on the social networking system 130. Some edges may be defined by users, allowing users to specify their relationships with other users. For example, users may generate edges with other users that parallel the users' real-life relationships, such as friends, co-workers, partners, and so forth. Other edges are generated when users interact with objects in the social networking system 130, such as expressing interest in a page on the social networking system, sharing a link with other users of the social networking system, and commenting on posts made by other users of the social networking system. The edge store 214 stores edge objects that include information about the edge, such as affinity scores for objects, interests, and other users. Affinity scores may be computed by the social networking system 130 over time to approximate a user's affinity for an object, interest, and other users in the social networking system 130 based on the actions performed by the user. Multiple interactions between a user and a specific object may be stored in one edge object in the edge store 214, in one embodiment. For example, a user that plays multiple songs from Lady Gaga's album, "Born This Way," may have multiple edge objects for the songs, but only one edge object for Lady Gaga.

The authorization server 222 enforces one or more privacy settings of the users of the social networking system 130. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 120 or any entity that can potentially access the information. The information that can be shared by a user comprises user profile information like profile photo, phone numbers associated with the user, user's connections, actions taken by the user such as adding a connection, changing user profile information the like.

The privacy setting specification may be provided at different levels of granularity. In some embodiments, the privacy settings specify action types, object types, object properties, or any combination thereof. In some embodiments, the privacy settings identify specific information to be shared with other users. For example, the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 120. One embodiment allows the specification of the set of entries comprise an enumeration of entities, for example, the user may provide a list of external systems 120 and/or third party applications that are allowed to access certain information. Another embodiment allows the specification to comprise a set of entities along with exceptions that are not allowed to access the information. For example, a user may allow all external systems 120 to access the user's work information but specify a list of external systems 120 that are not allowed to access the work information. Certain embodiments call the list of exceptions that are not allowed to access certain information a block list. External systems 120 belonging to a block list specified by a user are blocked from accessing the information specified in the privacy setting. Note that the various combinations of granularity of specification of information and the granularity of specification of entities with which information is shared are possible, i.e., all personal information may be shared with friends whereas all work information may be shared with friends of friends.

In some embodiments, the authorization server 222 stores privacy settings for a user for each third party application or entity associated with the user. For example, the privacy settings specify action types, object types, and object properties that a particular third party application may have access. In some embodiments, the privacy settings for a user include a set of privacy settings for all third party applications. For example, the privacy settings may specify action types that all third party applications may access.

In some embodiments, the privacy settings for a user store settings for publishing content. The publishing privacy settings may determine whether a third party application may publish personalized content to the user's friends or to the user only. The publishing privacy settings may also specify which communication channels the personalized content may be published to. For example, the personalized content may be published to a newsfeed, profile page, profile page containing timeline of the user's activities, application page, group page, dashboard page, message, or notification. The authorization server 22 may include privacy settings for each third party application or a single set for all of the third party applications associated with the user.

The authorization server 222 contains logic to determine if certain information associated with a user can be accessed by a user's friends, external systems 120 and/or other applications and entities. A third party application or an external system 120 may need authorization from the authorization server 222 to access information about a user that is aggregated based on one or more action types, one or more object types, one or more object properties, or any combination thereof. Based on the user's privacy settings, the authorization server 222 determines if another user, an external system 120, an application or another entity is allowed to access information associated with the user, including information about actions taken by the user. In one embodiment, the authorization server 22 uses a user's privacy settings to determine if a third party application or an external system 120 may access information about a user that is aggregated based on one or more action types, one or more object types, one or more object properties, or any combination thereof. The user's privacy settings may specify which other users, applications, external systems or other entities, are allowed to receive data about the user's actions or other information associated with the user.

Structure for Graph Actions and Graph Objects

Figure 3:
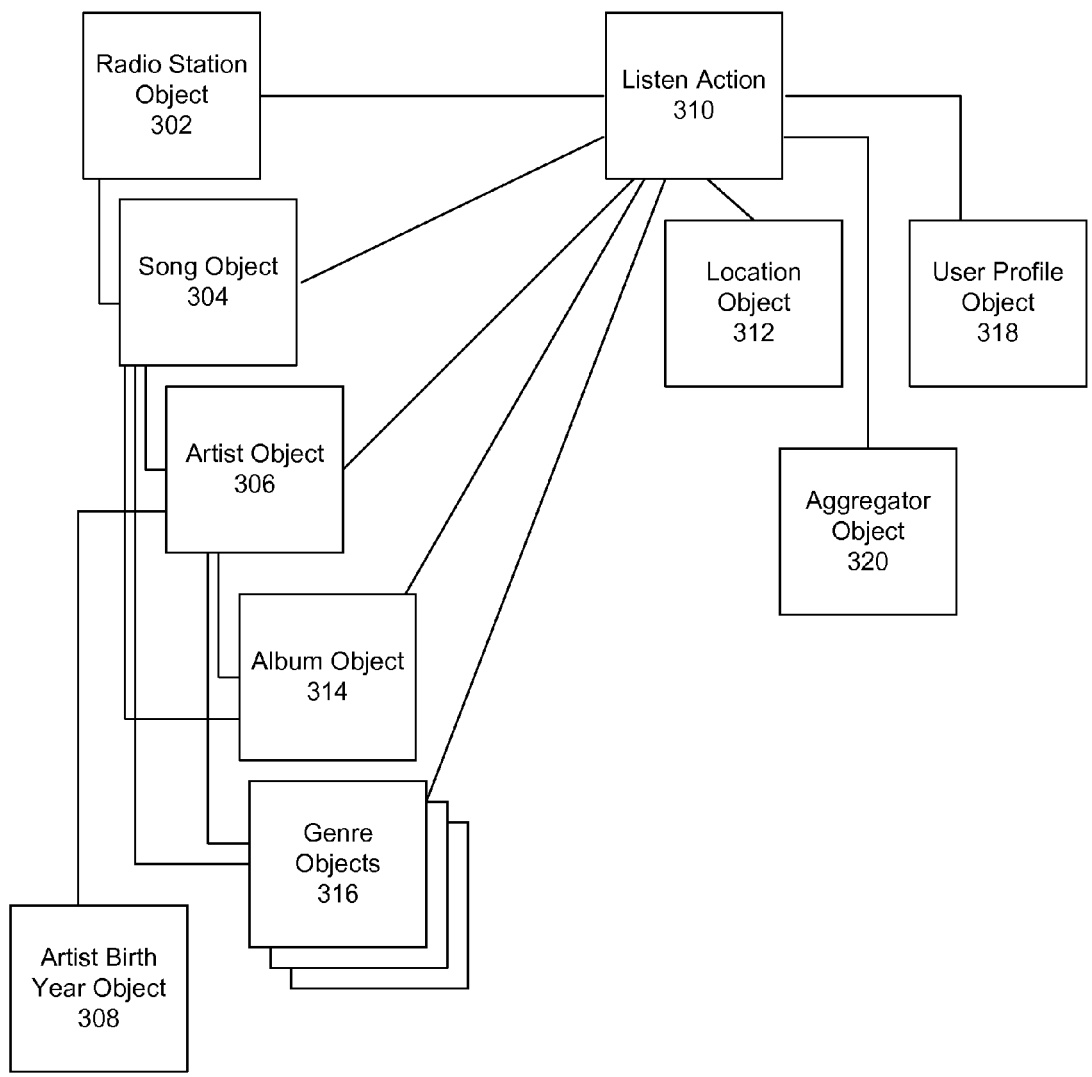
FIG. 3 is a high level block diagram of a defined graph structure representing a user action, in accordance with an embodiment of the disclosure.

FIG. 3 is a high-level block diagram of a defined graph structure representing a graph action and its relationship to graph objects, in accordance with an embodiment of the disclosure. Although only one action is illustrated, the listen action 310, a whole universe of actions is available to be defined within the social networking system 130. For example, users may read, purchase, sell, watch, want, play, achieve, take, recommend, review, visit, and comment on various objects, such as products, music, sporting matches, and movies. Entities external to the social networking system 130 may define these graph actions and graph objects for publishing into a social graph on the social networking system 130. The graph actions and graph objects may be performed by users on external systems 120 as well as on the social networking system 130.

As illustrated in FIG. 3 and discussed above, an example embodiment involves listening to music on an external system 120, such as an internet radio website. The listen action 310 may be defined for other external systems 120, including a stand-alone desktop application connected to a network 204, podcasts, terrestrial radio stations broadcasting through the Internet, a virtual music locker website, and a music streaming subscription service website. As mentioned above, in some embodiments, actions such as the listen action 310 can be defined to be open-ended so that new objects, such as playlists, podcasts, and streaming libraries, though not pictured, may be acted upon by the listen action 310. The listen action 310 may be defined by an entity external to the social networking system 130 through a tool provided by the social networking system 130, in one embodiment, that enables the entity to define action properties, including the types of objects that are associated with the listen action 310 type. The tool may expose a new action type on a web page on the social networking system 130 to enable entities external to the social networking system 130 to access the new action type.

Graph objects may be defined by an entity external to the social networking system 130 to include object properties. Object properties of a song object 304 may include a title, a duration, an artist object 306, an album object 314, and several genre objects 316, for example. Object properties of an artist object 306 may include an artist name, an album object 314, several genre objects 316, and an artist birth year object 308, for example. A radio station object 302 may include an association with a song object 304 that is created by an application. For example, a radio station object 302 may include a playlist of multiple song objects 304 that are to be played for users listening to the radio station associated with the radio station object 302. In one embodiment, objects have standard object properties, such as a title, description, image, and URL. Other object properties may be defined by the entity external to the social networking system 130. In this way, multiple different objects may be related to each other.

A radio station object 302 may be defined as having a name, such as "99.7 FM" or "Britney Spears Channel." The radio station object 302 may include properties, such as being owned by a corporation, being broadcast on specific internet URLs, etc. The radio station object 302 is linked to a song object 304. A song object 304 represents one song that has played on the radio station. The song object 304 is linked to an artist object 306 that performs the song. The artist object 306 may be linked to an artist birth year object 308 that represents the birth year that the artist was born. For example, if an artist object 306 represented "Britney Spears," then the artist object 306 would be linked to the "1981" birth year object 308 because the third-party developer would know that Britney Spears was born in 1981. Similarly, the owner of the song object 304 for "Till the World Ends," a song by Britney Spears, would also associate that song object 304 with the album object 314 for "Femme Fatale" and genre objects 316 for "pop," "dance-pop," and "electropop." Such information may be manually defined or automatically associated using information about the graph objects stored in databases.

A third-party application for an internet radio website may define objects for the radio stations, songs, artists, artist birth years, albums, and genres as described above using a tool provided by the social networking system 130, in one embodiment, or by describing objects in web pages on external systems 120 in markup language documents using tags in another embodiment. A listen action 310 may be defined by the same or another third-party developer or by an administrator of the social networking system 130. The listen action 310, like most actions, can be associated with a location object 312 to identify and record a geographic location where an action has taken place. The listen action 310 can also be associated with a user profile object 318 for the user that is performing the action. Finally, a property of the listen action 310 may include an aggregator object 320 that identifies how many times the listen action 310 has been performed. In one embodiment, this number of performed actions may be broken down by user, by location, by groups of users, or by any identifiable node in the social networking system 130.

In one example, a user of a social networking system 130 visited an internet radio website and had already given permission to share actions taken on the internet radio website hosted on the external system 120. The third-party application may encode tags in a markup language document to create graph object instances in the social networking system 130 as users perform actions on the internet radio website, such as listening to radio stations. As a user listens to music on the internet radio website, a listen action 310 may be recorded in an action log or communicated to the social networking system in association with the user profile object 318 for the user. The action log may include a user identifier, an action type of the graph action, an object identifier, time, date, and other metadata, such as object properties and action property values, such as how long the user listened to a song before skipping it. If the user is using a mobile device with GPS capability or if geographic location is otherwise available, then a location object 312 for that location may be associated with the listen action 310.

An aggregator object 320 may be associated with the listen action 310 to keep a count of how many times the action has been performed. In one embodiment, any object, such as a radio station object 302, song object 304, artist object 306, album object 314, genre objects 316, may be configured by a third-party developer or administrator of the social networking system as objects that may be aggregated upon. Because the graph structure is completely customizable, aggregation, as well as other statistical functions such as summation, frequency, distance, averages, and deviances from norm, may be performed on specified objects. For example, interesting data, such as the number of hours spent listening to Lady Gaga, represented by an artist object 306, may be determined from a simple query of the structured graph actions and graph objects and may be calculated on any set of users of the social networking system 130. As the user listens to a song on a radio station, the listen action 310 may be associated with the corresponding radio station object 302, song object 304, as well as the linked artist object 306, album object 314, and genre objects 316 for the song. The artist birth year object 308 is not directly linked to the listen action 310, but instead, is directly linked to the artist object 306. Thus, a specialized query may be utilized to generate interesting data visualizations, such as the top artists listened to, sorted by birth year.

Providing Aggregated User Data

Figure 4A:
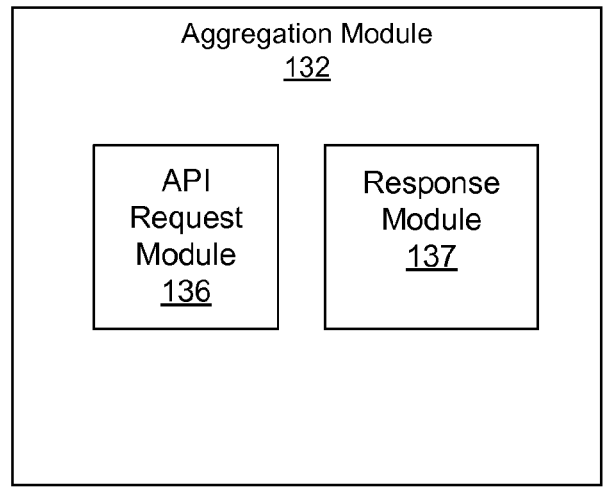
FIG. 4A is a high level block diagram illustrating aggregation module that includes various modules for providing third party application with data that is aggregated based on action type, in accordance with some embodiments.

FIG. 4A illustrates a high level block diagram of the aggregation module 132 in further detail, in one embodiment. The aggregation module 132 includes an API request module 140 and a response module 137. These modules may perform in conjunction with other modules to respond to requests for user data aggregated based on action types, objects types, object properties, or any combination thereof.

The API request module 136 receives application programming interface requests for user data. The requests maybe sent by a third party application or an external system. A request may include a user identifier and one or more parameters. The user identifier uniquely identifies a user or a user profile of the user. The parameters may specify one or more action types, one or more object types, one or more object features, or any combination thereof. Examples of action types include "listen," "play," and "watch." Examples of object types include check ins, posted links, photos, status message updates, genre of music or the number of times a song has been played. In some embodiments, a request includes information identifying the sender of the request. For example, the request may include information identifying a third party application or an external system.

The API request module 136 determines whether the sender of the request is authorized to access the requested information. The API request module 136 sends information identifying the sender of the request and the request parameters to the authorization server 222. If the API request module 136 receives authorization from the authorization server 222, the API request module 136 sends the request to the response module 137. Otherwise, the API request module 136 sends a message to the sender indicating that they do not have the appropriate access privileges. Alternatively, a dialog box may be presented to the user requesting permission.

The response module 137 aggregates a user's data from graph objects maintained by the social networking system based on the one or more parameters in an API request and provides the aggregated user data to the sender of the request. In one embodiment, the term "aggregate" means to retrieve, collect, or gather the requested information. In this case, the response module 137 retrieves the graph objects and then sends the graph objects or information from the graph objects to the sender of the request. For example, the request module 137 may retrieve a graph object containing information about a user's running activities and send that graph object to the sender of the request. In one embodiment, the term "aggregate" means to determine information based on several sets of information. Hence, in one embodiment, aggregate information may be a combination of several sets of information. In this case, the response module 137 analyzes the requested information and determines information based on the requested information. The determined information may be a summary or a metric about the requested information. For example, when the requested information describes the distances the user hikes over a period of time, the response module 137 may aggregate the requested information into statistics about average distance the user hikes in a week.

In one embodiment, the response module 137 responds to requests for a specific node in the social networking system 130 and edges related to that node. For example, a third party application for an online music streaming service may wish to identify user interactions related to Justin Bieber. As a result, the third party application for the online music streaming service may make an API call requesting this information, specifying the custom artist object as Justin Bieber. The response module 137 may respond with the user interaction information in a format requested by the third party application, in one embodiment. In another embodiment, the response module 137 responds to a request for edge information about a specified node with a listing of edge information about user interactions with the specified node, including the edge type and information about the user. Sophisticated third party applications may customize API calls to filter the user interaction information, such as including demographic filters, location filters, and the like.

In one example, the response module 137 responds to requests for user interactions having specific action types and having specific object properties. For example, a third party application request information about classical music songs the user has listened to by making an API call to the social networking system specifying the action type of "listen" and the object property of "classical." In another example, the third party application may request information about action movies the user likes by making an API call specifying the action type "watch" and the object property "action."

In another example, the response module 137 responds to requests for information about multiple types of actions performed on objects having a common object property. For example, a third party application for Starbucks may wish to gather information about users of the social networking system that have performed any kind of action at a Starbucks location, such as reading, drinking, being at, and the like. Specific Starbucks stores may have separate nodes on the social networking system, but share common object properties of being affiliated with Starbucks and being coffee shops. As a result, a number of API calls may be received that include the multiple action types and multiple object properties. In some embodiments, the response module 127 provides an aggregation object, which has been described above.

Publishing Personalized Content

Figure 4B:
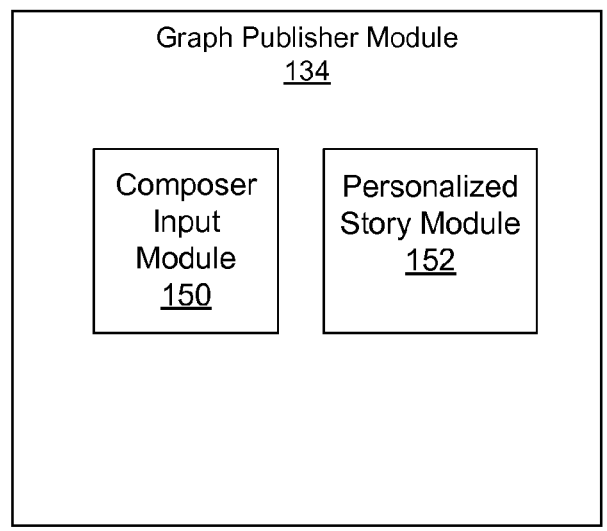
FIG. 4B is a high level block diagram illustrating a publisher module that includes various modules for publishing personalized content generated by third party applications, in accordance with some embodiments.

FIG. 4B illustrates a high-level block diagram of the aggregation module 132 in further detail, in one embodiment. The graph publisher module 134 includes a composer input module 150 and a personalized story module 152. These modules may perform in conjunction to publish personalized content that is generated based on the aggregated user data to the social networking system.

The graph publisher module 134 publishes personalized content to the social networking system. A third party application may generate the personalized content for a user based on the aggregations of the user's data provided by the aggregation module 132. In some embodiments, before publishing the personalized content, the graph publisher module 134 sends a request to the authorization server 222 to obtain authorization to publish the personalized content. The privacy settings for the user may specify which entities are allowed to publish content to the social networking system. In some embodiments, the privacy settings for the user specify where the personalized content may be published and who may view the personalized content. In some embodiments, the privacy settings may specify whether the user's connections may view the content.

Privacy settings also allow the user to regulate access to aggregated user data, or other data associated with the user, by an external system 120, by a third party application or by any other entity. Additionally, privacy settings may regulate sharing of data associated with a user between various third party applications and/or external systems 120; for example, a privacy setting may allow a third party application to access aggregated data associated with a user and also allow the third party application to share the aggregated data with one or more additional third party applications specified by the privacy settings. By sharing data between third party applications and/or external systems 120, additional information about the user may be available to the third party applications or external systems 120 to maintain more accurate information about the user. In one embodiment, third party applications or external systems 120 compensate the social networking system for accessing a user's aggregated data, provided the user allows such access.

The graph publisher module 134 publishes the personalized content to the social networking system via one or more modules that are chosen based on the type of the personalized content. In some embodiments, the personalized content includes information specifying how the content should be presented to the user. For example, the personalized content may include information that specifies that the personalized content should be published in a news story or inserted into a composer interface. In one embodiment, third party applications or external systems 120 may specify personalized content for publication to the social networking system and may specify privacy settings regulating access to the published content. For example, access to the content published by the third party application may be limited to the user or limited to the user and other users connected to the user. As an additional example, a third party application or external system 120 may allow other third party applications or external systems 120 having related subject matter to access the published content. For example, a video streaming application may allow other video streaming applications to access published content. Subject to privacy settings specified by the third party application or external system 120 and privacy setting specified by the user, advertisers may compensate one or more of the third party application, external system 120, user and/or social networking system to access the published content. For example, advertisers may target advertisements based on the published information.

The graph publisher module 134 includes a composer input module 150 that inserts personalized content into a composer interface. The personalized content may include images, links, videos, text, or any combination thereof. In some embodiments, the composer interface accepts content for a status message update. The content item generate by the composer interface may be displayed to the user and/or the connections of the user.

The graph publisher module 134 includes a personalized story module 152 that publishes personalized content as a news story. The news story may be displayed in the user's newsfeed and/or in the newsfeed of the user's connections. The news story may tag the user and one or more of the user's connections. For example, a news story that describes the user going surfing with two of the user's friends may tag the user and the user's friends in the news story.

The personalized content may provide insights into the aggregated user data. For example, when the aggregated user data is about the user's running, biking and hiking activities, the personalized content may include statistics about the user's activities and may provide recommendations for additional actions for the user. The personalized content may also report achievements and progress towards the user's goals, allowing the user to more easily ascertain progress towards goals or identify completion of achievements.

The personalized content may be displayed in a page for the third party application or the user's newsfeed, profile page, or a page that includes timeline of the user's activities. Alternatively, the personalized content may be presented to the user via a notification or alert. In some embodiments, the personalized content is presented to the user when one or more user-specified criteria are met. For example, a notification including personalized content is sent to the user or the personalized content is published as a newsfeed story to the user and/or to users connected to the user when a threshold is reached, a goal is accomplished, a milestone is met or any other suitable criteria is specified.

In some embodiments, the personalized content is published to a page only the user is allowed to access. For example, the user may have a private page (e.g., dashboard page) that includes personalized content generated from one or more third party applications. In some embodiments, the personalized content provides a comparison of the user's information with other users such as the user's connections. For example, the personalized content may present a chart showing how the user's run times compare to the user's connection's run times. The personalized content may also be displayed to other users connected to the user. For example, the personalized content may be displayed to the user's connections in the social networking system and to connections of the user's connections. Stated in another way, the personalized content may be displayed to the user's first and second degree connections.

Process for Providing Aggregated User Data

Figure 5:
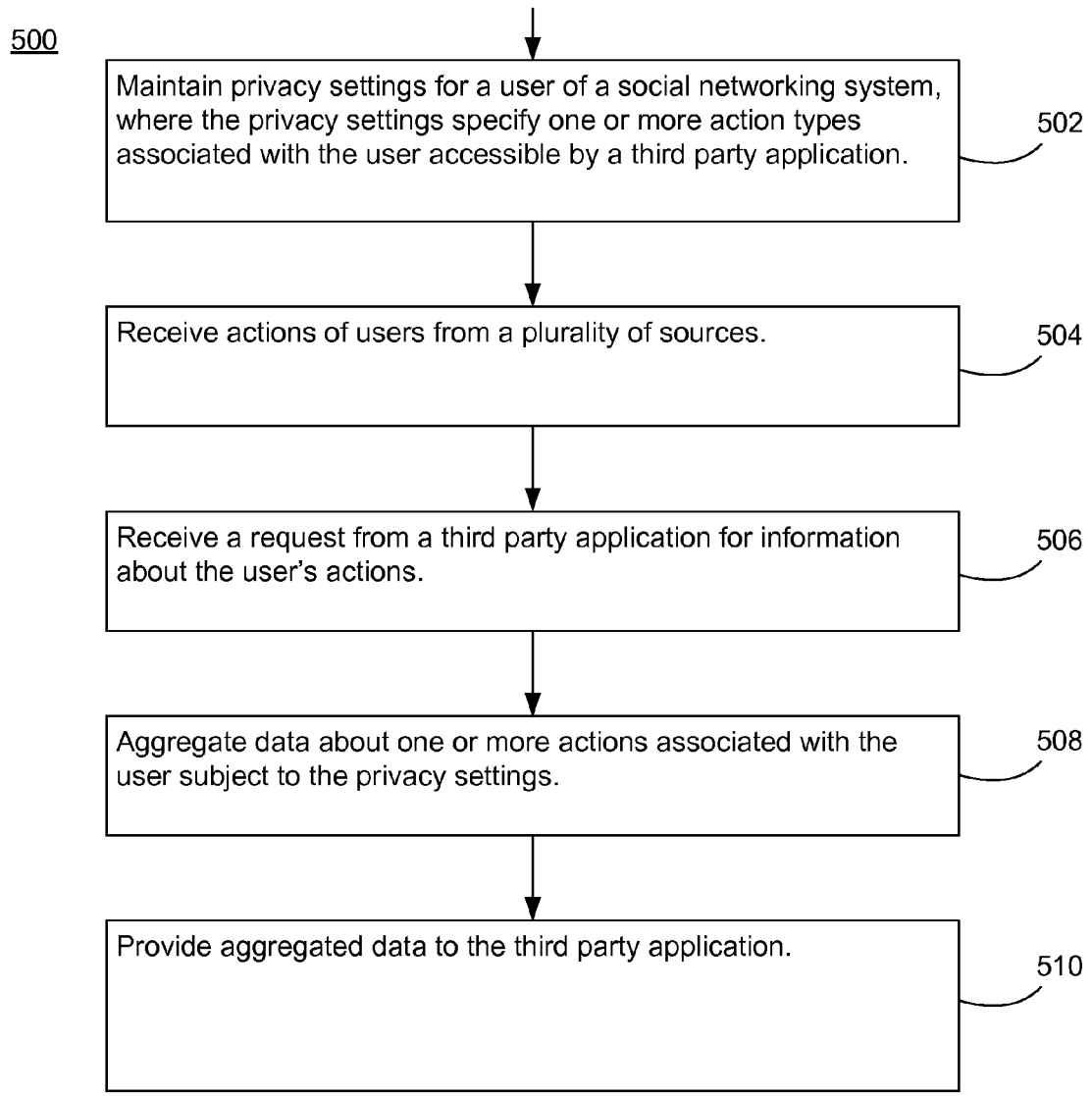
FIG. 5 is a flow chart illustrating a process for providing third party applications with data that is aggregated based on action type, in accordance with some embodiments.

FIG. 5 illustrates a flow chart of a process 500 of providing third party applications with user data that is aggregated based on action type. The process 500 is performed at a server system (e.g., social networking system 130) having one or more processors and non-transitory memory. The non-transitory memory stores one or more programs to be executed by the one or more processors. The one or more programs include instructions for process 500.

In this process 500, a social graph is maintained by a social networking system. The social graph includes data about actions of users of the social networking system, where the actions have action types. More specifically, the social graph includes edge objects which represent one or more actions having one or more action types. The edge objects indicate relationship between two or more graph objects of the social graph. The edge objects may store information about a user's interaction with another graph object. For example, when a user comments on a news story, an edge may be created or updated between the graph object for the user and the graph object for the news story. In some embodiments, at least one of the edge objects in the social graph maintained by the social networking system stores information items about actions performed by a user of the social networking system. In some embodiments, at least one of the edge objects in the social graph maintained by the social networking system includes information describing interactions of the user's connections in the social networking system.

Privacy settings for a user of the social networking system are maintained 502. The privacy settings specify one or more action types associated with the user accessible by a third party application. In particular, the privacy settings specify one or more action types of edge objects associated with the user that are accessible by a third party application, where the third party application is maintained by an entity distinct from the social networking system. The privacy settings may be received from the user. In particular, the privacy settings for the user may be specified by the user. For example, the user may specify that the third party application may access information about the user's interaction related to the actions of "watched," "played," "listened," and "shared." The user may specify different privacy settings for different third party applications. For example, the user may specify a first set of privacy settings to a third party application and a second set of privacy settings to another third party application. In some embodiments, the privacy settings specify one or more object types associated with the user that are accessible by a third party application. For example, the privacy settings for the third party application may specify that the third party application may access content items, events, and messages associated with the user. In some embodiments, the privacy settings may specify one or more object properties. For example, the privacy settings may specify types of restaurants or genres of movies.

User actions associated with the user are received 504 from a plurality of sources. More specifically, information about user actions is received from a plurality of sources, where the actions have action types. In some embodiments, the edge objects including information about the user's actions are received from a plurality of sources. The plurality of sources may include third party applications and external systems. In some embodiments, the user actions are received from multiple sources. For example, the plurality of sources includes at least two different third party applications or at least two different external systems. The edge objects may be transmitted to the social networking system by the user or a third party application. In some embodiments, the edge objects are retrieved or identified from the social graph maintained by the social networking system. In some embodiments, the plurality of sources does not include the third party application specified in the privacy settings. The edge objects may include information describing activities of the user on and off the social networking system. In some embodiments, at least one of the edge objects includes information describing activities of the user's connections in the social networking system.

A request from a third party application for information about actions of the user is received 506. More specifically, a request from a third party application for information about the edge objects associated with the user is received. In some embodiments, the request is received from an API call. In some embodiments, the request specifies one or more action types. For example, the request may specify the action types of action types of "run," "swim," and "bike." In some embodiments, the request specifies one or more object types. For example, the request may specify content items, events, and geographic locations. In some embodiments, the request specifies one or more object properties. For example, the request may specify a geographic location. In some embodiments, the request may specify one or more object types. For example, the request may specify check ins, posted links, photos, and status message updates. In some embodiments, the request specifies a combination of action types, object types, and object properties. For example, the request may specify the action type of "play," the object type of "songs," and the object property of a genre of songs or a threshold number of plays for a song. In some embodiments, at least one of the action types specified in the request is defined by an entity external to the social networking system. For example, a third party application may specify an action type of "exercise."

Data about one or more of the actions associated with the user are aggregated 508 subject to the privacy settings. In some embodiments, the data is aggregated from one or more edge objects of the social graph associated with the user subject to the privacy settings. In some embodiments, the data is aggregated from one or more edge objects associated with users who have established a connection with the user. Stated in another way, the data may be aggregated from one or more edge object containing information about activities of the user's connections. In some embodiments, the data is aggregated from one or more edge objects that match to the action types, object types, or object properties specified in the request. The data may be aggregated from one or more edge objects that match a combination of action types, objects types, or object properties. For example, the request may specify the action "play," the object type may be "songs," and the object property may specify a threshold number of plays for a song and the data may be aggregated from song objects that have been played by the user for a threshold number of times. In some embodiments, the data includes information about the user's connections in the social networking system. For example, when the request specifies a "with" action type, the social networking system may aggregate profile information of all of the people with which the user has been.

The aggregated data is provided 510 to the third party application. In some embodiments, the aggregated data is provided to the third party application as a graph object.

Process for Publishing Personalized Content

Figure 6:
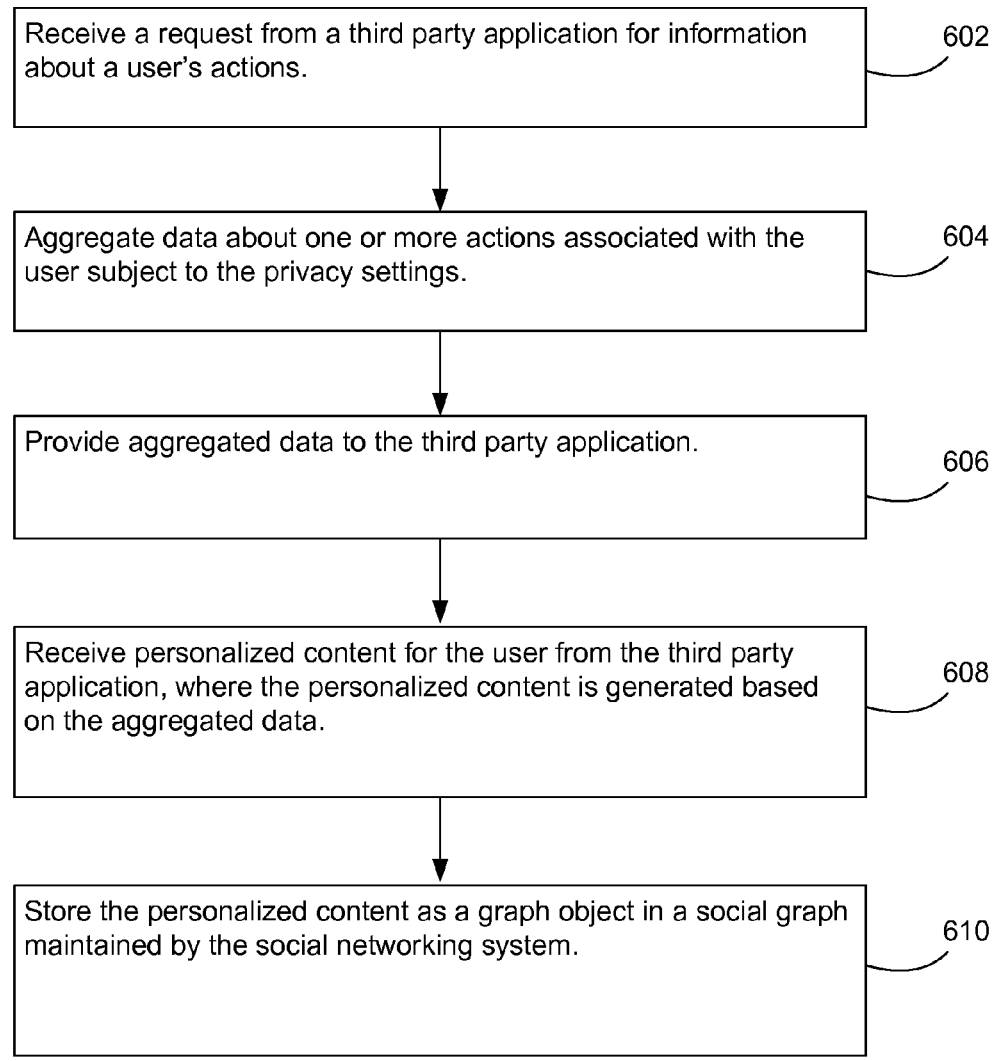
FIG. 6 is a flow chart illustrating a process for publishing personalized content to the social networking system, in accordance with some embodiments.

FIG. 6 illustrates a flow chart of a process 600 of publishing personalized content to the social networking system. The process 600 is performed at a server system (e.g., social networking system 130) having one or more processors and non-transitory memory. The non-transitory memory stores one or more programs to be executed by the one or more processors. The one or more programs include instructions for process 600.

In this process 600, a request from a third party application for information about the actions associated with a user is received 602. In some embodiments, the request from the third party application requests information about the edge objects associated with the user. The request specifies one or more action types, one or more object property types, one or more object properties, or any combination thereof. Data about one or more actions associated with the user are aggregated subject to the privacy settings. In some embodiments, the data is aggregated from one or more edge objects of the social graph associated with the user. In some embodiments, the data is aggregated from one or more edge objects of the social graph associated with users who have established a connection with the user. In some embodiments, the data is aggregated from one or more edge objects that match to the action types, object types, or object properties specified in the request. The aggregated data is provided 606 to the third party application.

Personalized content for the user is received 608 from the third party application. The third party application generates the personalized content using the aggregated data. In some embodiments, the personalized content includes statistics about the user's activities described in the aggregated data. For example, when the aggregated data includes information or insights about the user's running activities, the statistics may include the average distance the user's runs a week. In some embodiments, the personalized content indicates the user's progress towards a goal. For example, the user may have a goal of running ten miles in a month and the personalized content may indicate the user's progress towards that goal. In some embodiments, the personalized content includes information about one or more of the user's connections. In some embodiments, the personalized includes a comparison of the user's activities and the activities of one or more of the user's connections. For example, the personalized content may show a comparison of the user's run times with the connection's run times.

In some embodiments, the personalized content is inserted into a composer interface. For example, the personalized content may be inserted into a composer interface for posting status message updates. In some embodiments, the personalized content is inserted into a news story and displayed in the user's newsfeed or profile page. In some embodiments, the news story is displayed to connections of the user. The news story may tag one or more users mentioned in the news story.

The personalized content is stored 610 a graph object in the social graph maintained by the social networking system. In some embodiments, the graph object storing the personalized content is associated with the one or more edge objects associated with the aggregated data. The personalized content may be published to one or more pages of the social networking system. For example, the news story may be published to a page only the user may view (e.g., a dashboard page).

Example Operation

Figure 7:
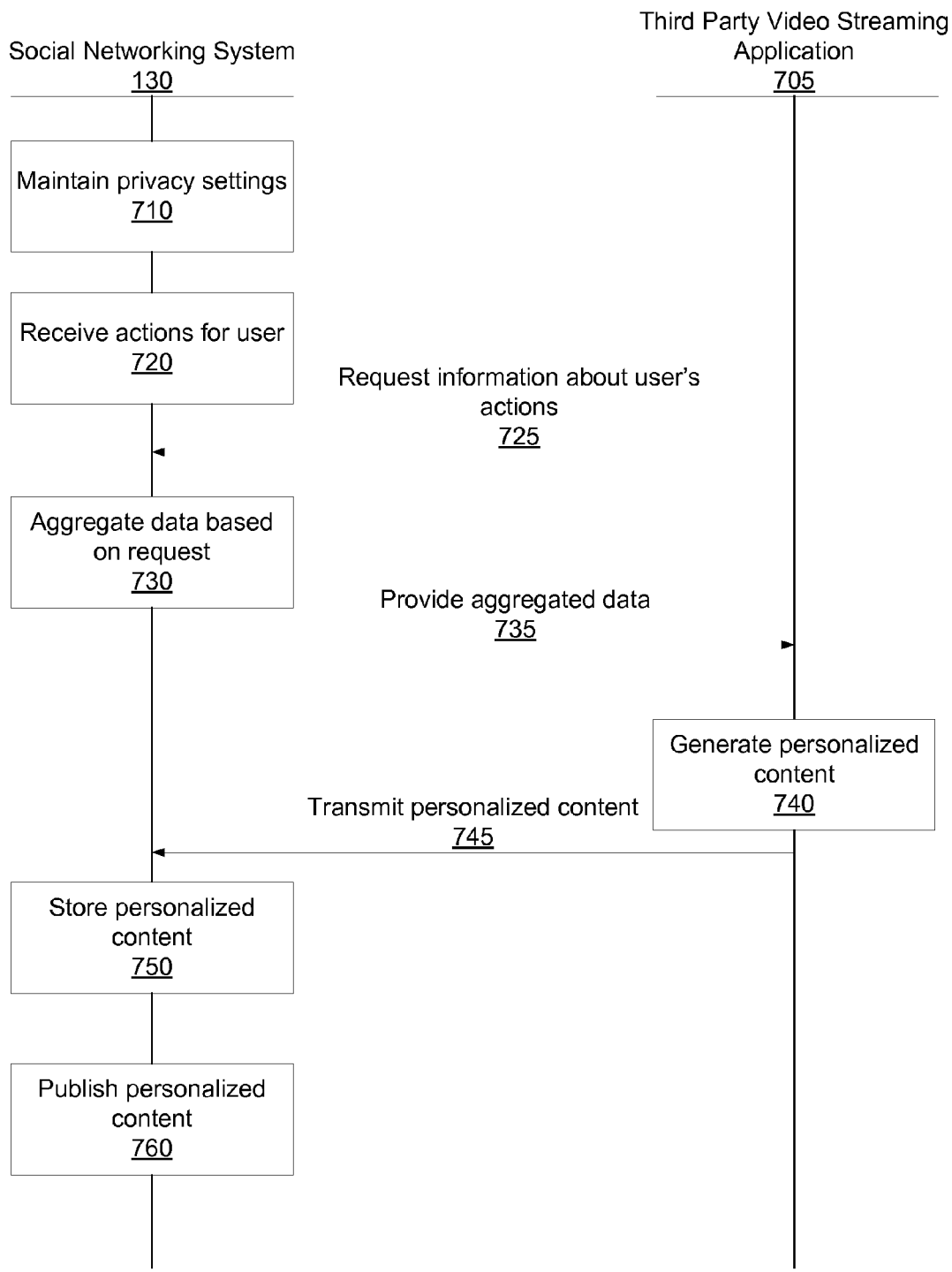
FIG. 7 is an interaction diagram of an example of publishing personalized content generated from aggregated data to a social networking system, in accordance with some embodiments.

FIG. 7 is an interaction diagram of an example of publishing personalized content generated from aggregated data. In the example of FIG. 7, a third party video streaming application 705 generates personalized content from aggregated data from a social networking system 130; however, any third party application or external system 120 may generate personalized content. A user maintains 710 one or more privacy settings allowing a third party video streaming application, such as the third party video streaming application 705, to access specified action types associated with the user. In this example, the privacy settings allow the third party video streaming application 705 to access action types of "viewed," "bought," "watched," "played," "listened," or "shared." Additional privacy settings may be maintained 710 for an additional third party video streaming application, allowing the user to differently regulate the action types accessible by different third party applications; for example, privacy settings allow the additional third party video streaming application to access action types of "watched," "bought" or "played," allowing the user to customize the action types accessible to the different third party video streaming applications.

Actions having different action types and associated with the user are received 720 from various sources. For example, actions having a "watched" action type are received 720 from the user viewing video data via the social networking system or actions having a "shared" action types are received 720 when the user shares video data with other social networking system users. Actions performed off the social networking system may also be received. For example, a user purchasing a movie or other online video content from an online marketplace is received 720 as an action having a "bought" action type.

The third party video streaming application 705 requests 725 information about the user's actions, and when the social networking system receives the request from the third party video streaming application 705, action types and/or object types are extracted from the request and used to identify data for communication with the third party video streaming application. For example the third party video streaming application 705 requests 725 action types of "bought," "watched" and "shared" to retrieve specific actions. Additional information may be included in the request, allowing the third party video streaming application 705 to further refine the data to be retrieved. For example, the third party video streaming application 705 may specify geographic locations associated with movie theaters to identify objects where the user was at a move theater when watching a movie or may identify pages in the social networking system to identify pages associated with content watched by the user or bought by the user.

Data satisfying the criteria in the request is aggregated 730 and provided 735 to the third party video streaming application 705. For example, data is aggregated 730 from edge objects having action types of "bought," "watched" and "shared" to retrieve data describing content the user bought, watched or shared. Similarly, content watched when the user is at a geographic location specified by the request is aggregated 730 or pages associated with content that the user watched or bought is aggregated 730 and provided 735 to the third party video streaming application 705.

Based on the aggregated data, the third party video streaming application 705 generates 740 personalized content for the user. For example, the personalized content identifies video data that the user most frequently watched, identifies content watched or shared by the user during a specified time interval or identifies content watched while the user was at a specified geographic location. In some embodiments, the personalized content indicates the user's progress towards a goal, such as watching a specified list of movies. The personalized content may be generated 740 based on the aggregated data meeting one or more specified criteria. For example, the third party video streaming application 705 generates personalized content if the aggregated data indicates the user watched a particular movie or watched a specified movie while checked-in at a specified location.

The third party video streaming application 705 transmits 745 the personalized content to the social networking system 130, which stores 750 the personalized content as a graph object in the social graph maintained by the social networking system 130. In one embodiment, the social networking system 130 also inserts the personalized content in a composer interface, such as an interface for posting status message updates. Additionally, the personalized content may be published 760 to the user and/or other users connected to the user. For example, the personalized content may be included as a news story in a news feed presented to the user or to users connected to the user, provided as a notification to the user, included on the user's profile page or presented to the user in any suitable manner.

As described above, the user may maintain privacy settings regulating the personalized content that the third party video streaming application 705 may publish 760 through the social networking system 130. For example, a privacy setting may limit the third party video streaming application to publishing 760 personalized content based on "watched" action types but not based on "bought" action types. An additional privacy setting may allow an additional third party video streaming application to publish 760 personalized content based on "watch" action types to users connected to the user but not to additional users not connected to the user but connected to the users connected to the user.

Summary

The foregoing description of the embodiments of the invention has been presented for the purpose of illustration; it is not intended to be exhaustive or to limit the systems and methods to the precise forms disclosed. Persons skilled in the relevant art can appreciate that many modifications and variations are possible in light of the above disclosure.

Some portions of this description describe the embodiments of the systems and methods in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the systems and methods may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the systems and methods may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the systems and methods systems and methods be limited not by this detailed description, but rather by any claims that issue on an application based hereon. Accordingly, the disclosure of the embodiments of the systems and methods are intended to be illustrative, but not limiting, of the scope of the invention, which is set forth in the following claims.

What is claimed is:

1. A method comprising:
   maintaining a social graph at a social networking system, the social graph comprising edge objects, each edge object representing one or more actions having one or more action types and indicating a relationship between two or more graph objects of the social graph;
   maintaining privacy settings for a user of the social networking system, the privacy settings specifying one or more action types of edge objects associated with the user accessible by a third party application, wherein the third party application is maintained by an entity distinct from the social networking system;
   receiving edge objects associated with the user from a plurality of sources;
   receiving a request from the third party application for information about the edge objects associated with the user;
   aggregating data about one or more edge objects of the social graph associated with the user subject to the privacy settings, the aggregated data including identifying information about edge objects having action types specified by one or more privacy settings as accessible to the third party application; and
   providing the aggregated data to the third party application.

2. The method of claim 1, wherein the plurality of sources comprise sources other than the requesting third party application.

3. The method of claim 1, wherein the request is received from an application programming interface (API) call.

4. The method of claim 1, wherein the request specifies one or more action types.

5. The method of claim 4, wherein the request from the third party application specifies a threshold number of actions having the one or more action types and wherein aggregating data about one or more edge objects of the social graph further comprises: aggregating data from edge objects having the one or more action types and describing at least the threshold number of actions for the user.

6. The method of claim 4, wherein at least one of the one or more action types is defined by an entity external to the social networking system.

7. The method of claim 4, wherein at least one edge object of the one or more edge object describes activities of the user and at least one connection of the user.

8. The method of claim 1, wherein the request from the third party application specifies one or more object properties.

9. The method of claim 8, wherein at least one object property of the one or more object properties comprises a geographic location.

10. The method of claim 1, wherein the request from the third party application specifies one or more object types.

11. A method comprising:
- maintaining in a social networking system data about actions of users of the social networking system, the actions having action types;
- maintaining privacy settings for a user of the social networking system, the privacy settings specifying one or more action types associated with the user accessible by a third party application, wherein the third party application is maintained by an entity distinct from the social networking system;
- receiving actions of the user from a plurality of sources;
- receiving a request from the third party application for information about the actions of the user;
- aggregating information from data about actions of the user subject to the privacy settings, the aggregated data including identifying information about edge objects having action types specified by one or more privacy settings as accessible to the third party application; and
- providing the aggregated information to the third party application.

12. A method comprising:
- receiving a plurality of actions of a certain action type associated with a user, wherein the actions are received from multiple sources;
- receiving a privacy setting indicating whether a particular third party application can receive information about actions of the user of the certain action type;
- aggregating information from data about actions of the user subject to the privacy setting, the aggregated data including identifying information about edge objects having action types specified by one or more privacy settings as accessible to third party applications; and
- sharing information about the user's actions of the certain action type with another third party application subject to the privacy setting.

* * * * *